(12) United States Patent
Miyano

(10) Patent No.: US 6,307,683 B1
(45) Date of Patent: Oct. 23, 2001

(54) ZOOM LENS

(75) Inventor: Hitoshi Miyano, Kumagaya (JP)

(73) Assignee: Fuji Photo Optical Co., Ltd, Omiya (JP)

( * ) Notice: Subject to any disclaimer, the term of this patent is extended or adjusted under 35 U.S.C. 154(b) by 0 days.

(21) Appl. No.: 09/520,141

(22) Filed: Mar. 7, 2000

(30) Foreign Application Priority Data

Mar. 25, 1999 (JP) .................................................. 11-081849

(51) Int. Cl.$^7$ ............................ G02B 15/02; G02B 15/14
(52) U.S. Cl. ........................................... 359/675; 359/686
(58) Field of Search ..................................... 359/675, 686

(56) References Cited

U.S. PATENT DOCUMENTS

| 3,751,136 | * | 8/1973 | Kirchoff ................................ 359/669 |
| 4,146,305 | * | 3/1979 | Tanaka .................................. 359/686 |
| 4,318,592 | * | 3/1982 | Tanaka .................................. 359/674 |
| 4,330,180 | * | 5/1982 | Tanaka .................................. 359/674 |
| 5,097,360 | * | 3/1992 | Fukami et al. ......................... 359/674 |
| 5,668,666 | * | 9/1997 | Suzuki .................................. 359/674 |

FOREIGN PATENT DOCUMENTS

| 55-45080-A | * | 3/1980 | (JP) ..................................... 359/675 |
| 2840283 |   | 10/1998 | (JP) . |

* cited by examiner

*Primary Examiner*—Evelyn A Lester
(74) *Attorney, Agent, or Firm*—Arnold International; Bruce Y. Arnold

(57) ABSTRACT

A zoom lens for television broadcasting cameras suitable for both regular and high definition television (HDTV) format cameras is disclosed. The zoom lens is formed of a zoom lens main body having four lens groups and a supportive lens attachment that may be removably inserted in the optical path of the fourth lens group. In order from the object side, the first lens group is stationary when zooming and has positive refractive power, the second lens group has negative refractive power and moves to accomplish zooming, the third lens group may be of either negative or positive refractive power and shifts in position when zooming in order to maintain the image surface at a fixed position, and the fourth lens group is composed of two sub-assemblies which are fixed in position and separated from one another a distance sufficient to enable a supportive lens attachment to be inserted in the light path of the zoom lens when the zoom lens is used for imaging onto an image sensor having HDTV format. The supportive lens attachment if formed of a positive lens group and a negative lens group. When inserted with the positive lens group nearest the object side, the supportive lens attachment increases the focal length of the zoom lens, thereby forming a larger image which fully illuminates the wider format of an HDTV image sensor. When imaging for regular television, in which the aspect ratio (width to height) of the image sensor is 4:3, the supportive lens attachment 4 is withdrawn from the optical path. When imaging for HDTV, which uses image sensors having an aspect ratio of 16:9, the above-mentioned supportive lens attachment is inserted into the optical path. The supportive lens attachment is formed of positive and negative lens groups, which preferably meet a specified condition.

6 Claims, 10 Drawing Sheets

Embodiment 1

Embodiment 2

ZOOM LENS

BACKGROUND OF THE INVENTION

In general, television cameras for broadcasting input light from a view field into a color separation prism in order to obtain three separate, high quality, color-component images. A CCD array is then employed for each separated color component in order to obtain image information for that color component. In addition, television cameras are normally designed to employ a zoom lens for imaging objects onto the three CCD arrays. The aspect ratio (the ratio of the image width to height) for regular television viewing is fixed, and is 4:3.

However, a broadcasting format commonly known as high definition television, or HDTV, has been in market demand in recent years. The aspect ratio of the TV image in this format is 16:9. Therefore, when the height of the image remains the same as when using an aspect ratio of 4:3, with HDTV format the horizontal width of the image increases by a factor of 1.3333, and the diagonal measurement of the image increases by a factor of 1.2238.

As a result, if one were to attempt to use a zoom lens designed for regular TV (i.e., where the aspect ratio is 4:3) for HDTV (where the aspect ratio is 16:9), the illuminating beam of light from the lens would provide an image that is too small, in that the image would not fill the CCD array. From a different viewpoint, one could say that a zoom lens for regular TV is insufficient for HDTV use because the focal distance of the zoom lens is too short to fully illuminate the wider format of the HDTV image sensors.

BRIEF SUMMARY OF THE INVENTION

The present invention is designed to overcome this problem. The object of the invention is to provided a zoom lens that can be easily modified to increase its focal length for use with an image sensor having an aspect ratio of 16:9 instead of 4:3. Thus, when using such a zoom lens for image sensors having the HDTV format, the larger image as a result of the increased focal length will illuminate the entire area of the image sensor.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 3A illustrates the ray paths without the supportive lens attachment 4 in the light path. FIG. 3B illustrates the ray paths with the supportive lens attachment 4 in the light path and oriented in its normal position so as to increase the focal length of the zoom lens. FIG. 3C illustrates ray paths with the supportive lens attachment 4 in the light path but oriented in reverse to thereby decrease the focal length of the zoom lens.

DETAILED DESCRIPTION

This invention concerns a zoom lens having a supportive lens attachment which can conveniently be attached or detached from a zoom lens main body. The zoom lens is intended for use with a broadcast television camera. In other words, this invention concerns a zoom lens for mounting on a broadcast television camera, the zoom lens having a main body and an auxiliary supportive lens attachment (a so-called "extender lens"), that can be detachably attached to the zoom lens main body.

Figure 1:
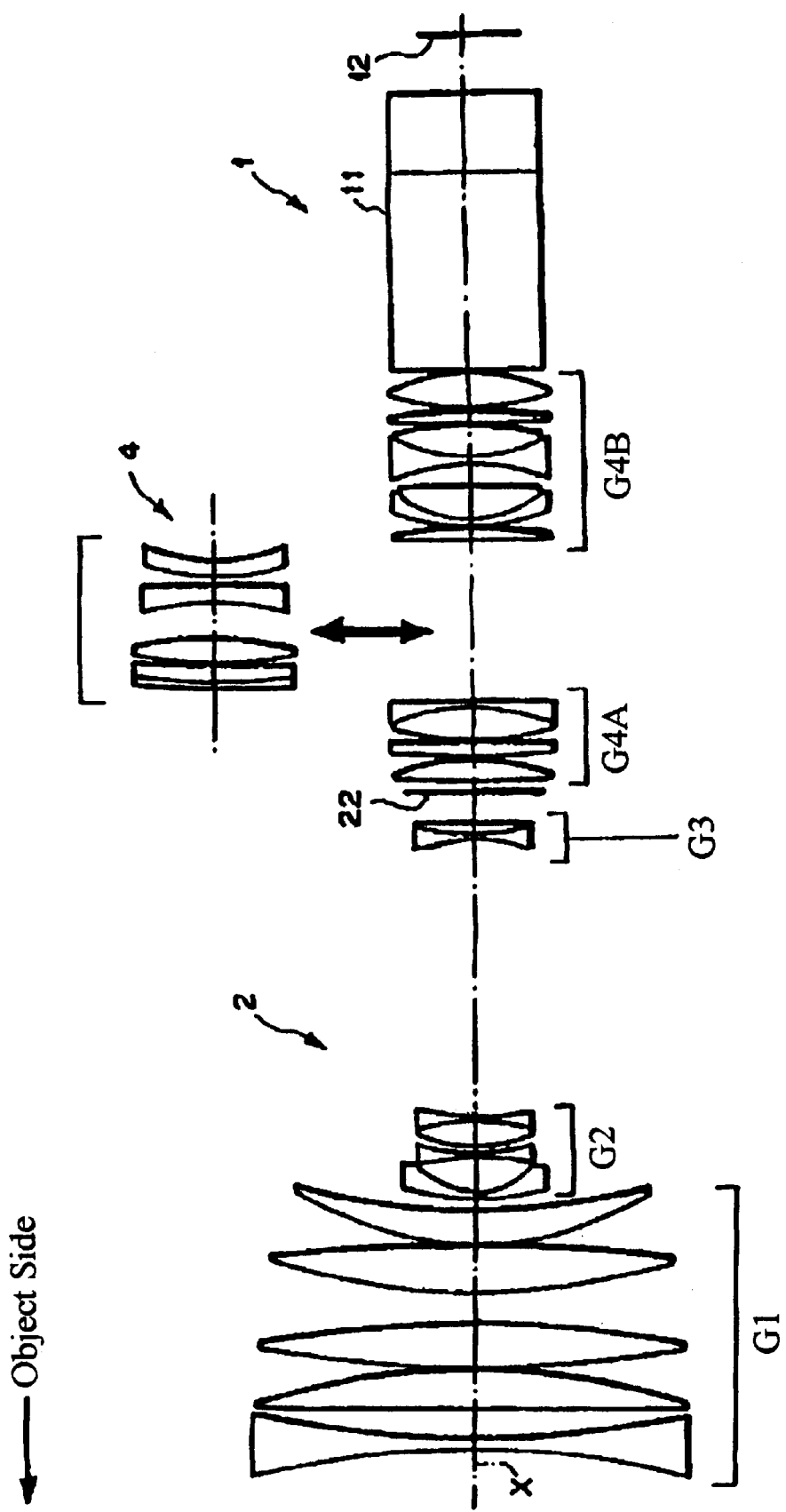
FIG. 1 shows the basic lens element configuration of the zoom lens of the present invention, wherein the zoom lens includes a supportive lens attachment 4 that is detachably attachable to a zoom lens main body.

FIG. 1 shows the overall design of the zoom lens of the present invention. The zoom lens is installed on the object-side of a television camera 1 having an image-sensing device 12. The camera main-body 1 supports a zoom lens main-body 2 and a supportive lens attachment 4 that can be detachably attached to the zoom lens main body 2 for converting the focal distance of the zoom lens. The supportive lens attachment 4, is itself nearly afocal. When attached so as to be in the optical path (which is centered along the optical axis X), the supportive lens attachment 4 shifts the focal distance of the zoom lens by varying the ray heights on the optical components that follow the supportive lens attachment. The television camera main body 1 includes a color separation prism 11 and an image-sensing device 12. The color separation prism 11 separates a beam of polychromatic light, which contains object information, into three color components, B, R, and G. Although the image-sensing device 12 is actually designed with a separate CCD array to sense each color-component image, for simplicity of illustration, only one image-sensing device 12 is shown.

As can be seen in FIG. 1, the zoom lens main body 2 is constructed of four lens groups, in sequential order from the object side as follows. The first lens group G1 is constructed of five lens elements, has overall positive refractive power and is fixed in position with respect to the image surface during zooming. The second lens group G2 is constructed of four lens elements, has overall negative refractive power, and is moved to the image side when zooming from the wide-angle end to the telephoto end, in order to vary the focal length. The third lens group G3 may be of positive or negative refractive power and is constructed of two lens elements, and is moved axially first in one direction and then in the opposite direction along the optical axis when zooming from the wide-angle end to the telephoto end so as to precisely correct for shifting of the image surface which otherwise would occur with zooming. The fourth lens group G4 (not labeled) has positive refractive power and includes two sub-groups which are fixed in position. Sub-group G4A is the first sub-group, in order from the object side, and has positive refractive power and four lens elements. Sub-group G4B is of negative refractive power and has seven lens elements. Also, the zoom lens main-body has a surface 22 which serves as a shutter or stop and is positioned between the third lens group G3 and the fourth lens sub-group G4A.

The lens sub-groups G4A and G4B each serve as relay lenses, and are designed to be separated by a sufficiently large spacing to enable the insertion of the supportive lens attachment 4 when the zoom lens is to be used for HDTV. The supportive lens attachment 4, in its preferred orientation as described above, increases the focal distance of the zoom lens when inserted into the light path. The supportive lens attachment is formed, in order from the object side, of a first lens group having a focal length $f_1$ and a second lens group having a focal length $f_2$, with the first lens group having positive refractive power and the second lens group having negative refractive power. Of course, if oriented backwards to that described above, the supportive lens attachment 4 will serve to decrease the focal distance of the zoom lens, and this may be useful in certain other applications of the zoom lens.

Figure 2:
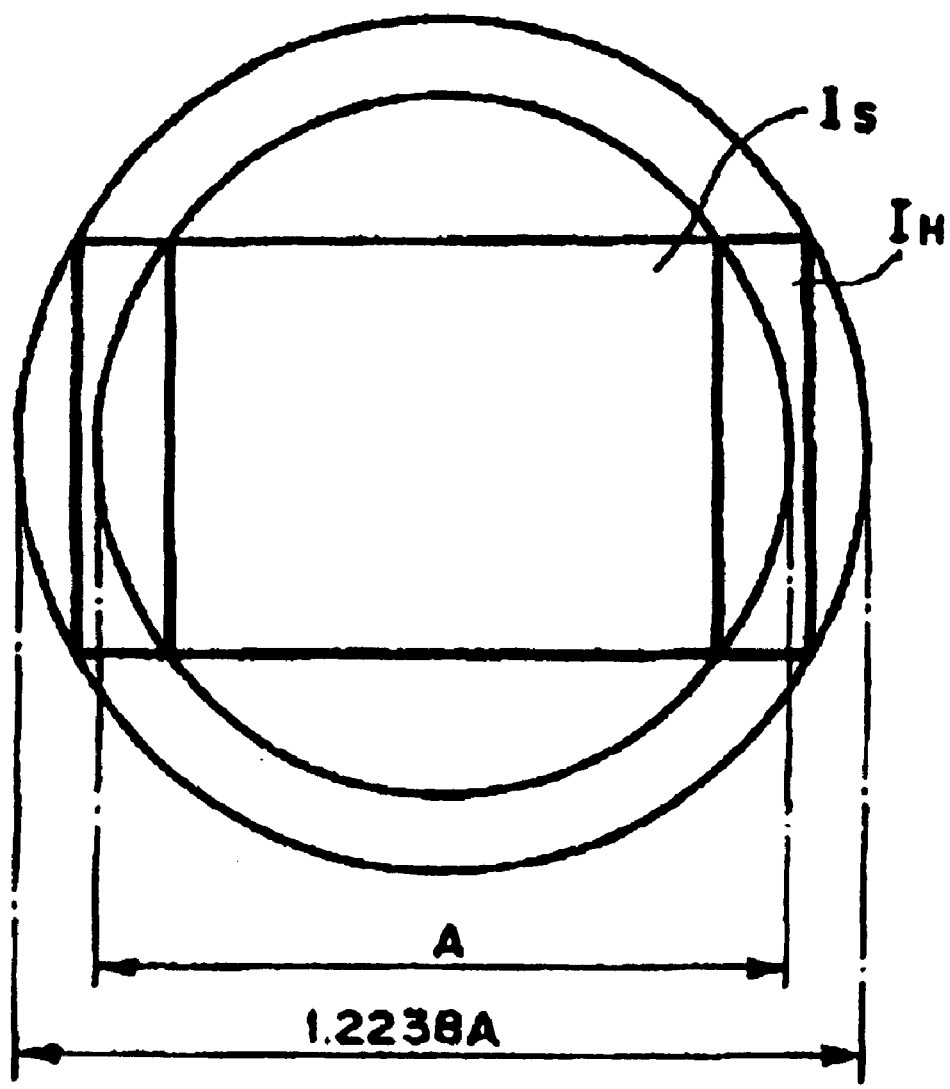
FIG. 2 shows image spots of the zoom lens shown in FIG. 1, in the case of the supportive lens attachment being detached (the smaller circle), and attached (the larger circle) so as to increase the focal length of the zoom lens, to thereby illuminate fully the wider image sensors of HDTV.

HDTV in recent years has become increasing popular. However, a different, wider, image format is used in HDTV as compared with regular TV. The wider rectangle $I_H$ in FIG. 2 illustrates the shape of the image sensor format of a television camera for HDTV, which has an aspect ratio of 16:9 (width to height). Therefore, when the vertical dimension of the image remains the same as for a television camera used in regular television, which has a format indicated by Is, which has an aspect ratio of 4:3, the horizontal length of the image sensor is 1.3333 times larger, and the diagonal dimension of the image sensor is 1.2238 times larger. As a result, when using a zoom lens for a regular television camera without any modification for HDTV imaging, the light of the image spot having a diameter A has too small a diameter to fully illuminate the corner regions of the image sensor. One way of solving this problem is to make the zoom lens have a longer focal length so that the projected image spot will be larger and fully illuminate the wider rectangle $I_H$.

The zoom lens of the present invention is designed to be useable with either regular or high definition television. When imaging with an image-sensor for regular television (having an aspect ratio of 4:3), the above-mentioned supportive lens attachment 4 is withdrawn from the light path, as illustrated in FIG. 1. When imaging for HDTV format (having an aspect ratio of 16:9), the supportive lens attachment 4 is inserted into the light path in the space indicated between the front sub-group G4A and the rear sub-group G4B so that it is aligned with the optical axis X and, ideally, so that it increases the focal length of the zoom lens by a factor near 1.2238, to thereby enlarge the image sufficiently to illuminate fully the HDTV image sensor, as illustrated in FIG. 2. Of course, because the zoom lens main body has a variable focal length, a lesser or greater increase in the focal length by the supportive lens attachment is also acceptable. However, the following condition is preferably satisfied:

$$-1.3 < f_1/f_2 < -1.1 \qquad \text{Condition (1)}$$

where $f_1$ is the focal length of the positive lens group of the supportive lens attachment, and $f_2$ is the focal length of the negative lens group of the supportive lens attachment.

If the increase in focal length is nearly 1.2238, there will be no noticeable change in image angle between the two image formats when employing the zoom lens of the present invention.

Figure 3A:
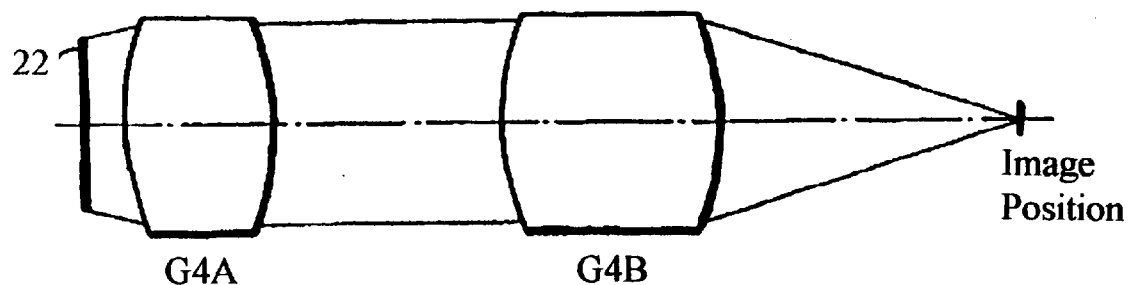
FIGS. 3A–3C are schematic diagrams (not drawn to the same scale, in terms of image position) illustrating ray paths from the surface 22, which serves as a shutter or stop, to the image position.
Figure 3B:
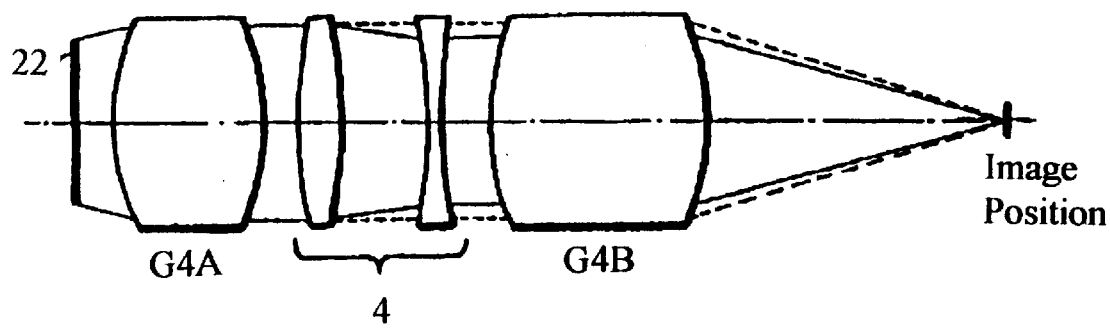
Figure 3C:
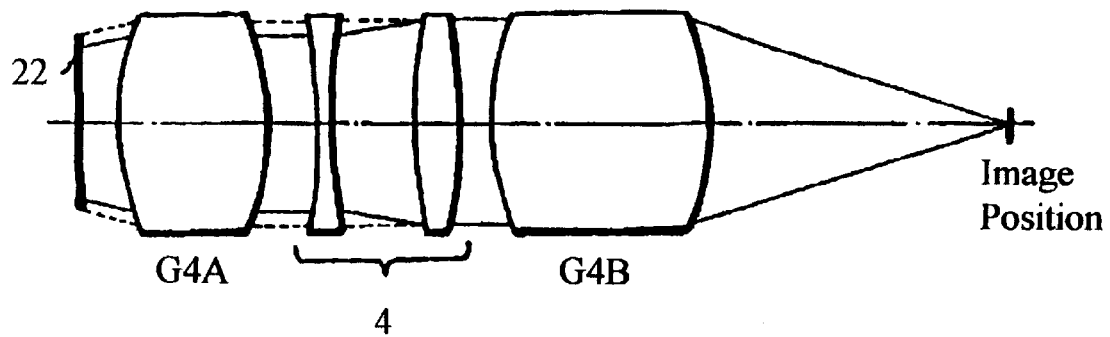

FIGS. 3A–3C (not drawn to scale) are schematic diagrams illustrating ray paths from the surface 22 to the image position. FIG. 3A illustrates the ray paths without the supportive lens attachment 4 in the optical path. FIG. 3B illustrates the ray paths with the supportive lens attachment 4 in the light path and oriented in its normal position so as to increase the focal length of the zoom lens. FIG. 3C illustrates ray paths with the supportive lens attachment 4 in the light path but oriented in reverse with respect to the light path to thereby decrease the focal length of the zoom lens, as may be useful in other applications, such as changing the range of zoom of the zoom lens to a smaller range.

Two specific embodiments of the invention will now be given.

Embodiment 1

Figure 4:
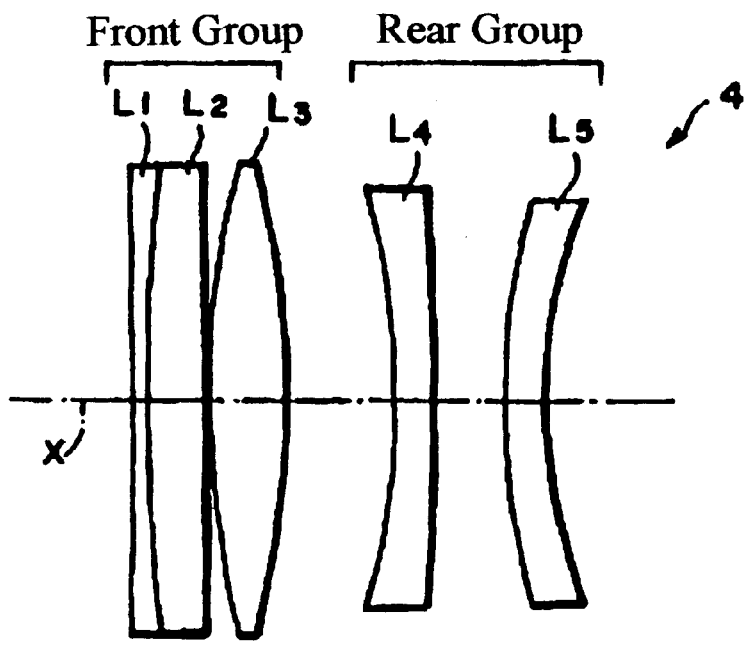
FIG. 4 shows the supportive lens attachment 4, according to Embodiment 1, oriented so as to extend the focal length of the zoom lens.

The zoom lens of this embodiment employs the supportive lens attachment 4 as illustrated in FIG. 4 so as to be insertable into the light path of the zoom lens main body 2.

Table 1 below lists, for the zoom lens main body 2, the surface number # in order from the object side, the radius of curvature R (in mm) near the optical axis of each lens element surface, the on-axis surface spacing D, as well as the index of refraction $N_d$ and the Abbe value $v_d$ (at the sodium d-line) for each lens element of the zoom lens main body.

TABLE 1

| # | R | D | $N_d$ | $v_d$ |
|---|---|---|---|---|
| 1 | −142.579 | 2.127 | 1.80518 | 25.4 |
| 2 | 174.496 | 5.024 | | |
| 3 | ∞ | 6.946 | 1.43387 | 95.2 |
| 4 | −104.915 | 0.098 | | |
| 5 | 241.507 | 6.709 | 1.43387 | 95.2 |
| 6 | −180.138 | 6.366 | | |
| 7 | 105.317 | 8.067 | 1.56907 | 71.3 |
| 8 | −257.218 | 0.098 | | |
| 9 | 54.729 | 5.269 | 1,81600 | 46.6 |
| 10 | 111.186 | D10(variable) | | |
| 11 | 48.269 | 0.655 | 1.83400 | 37.2 |
| 12 | 12.040 | 5.817 | | |
| 13 | −52.555 | 0.655 | 1.83480 | 42.7 |
| 14 | 34.693 | 1.162 | | |

TABLE 1-continued

| # | R | D | $N_d$ | $\nu_d$ |
|---|---|---|---|---|
| 15 | 21.761 | 4.017 | 1.84665 | 23.8 |
| 16 | −41.755 | 0.565 | | |
| 17 | −27.326 | 0.655 | 1.77250 | 49.6 |
| 18 | 67.582 | D18(variable) | | |
| 19 | −23.182 | 0.655 | 1.75500 | 52.3 |
| 20 | 35.351 | 2.029 | 1.84665 | 23.8 |
| 21 | ∞ | D21(variable) | | |
| 22 | ∞ (stop) | 1.620 | | |
| 23 | 144.426 | 4.132 | 1.55671 | 58.5 |
| 24 | −31.731 | 0.098 | | |
| 25 | 130.345 | 2.774 | 1.58913 | 61.2 |
| 26 | −1773.082 | 0.098 | | |
| 27 | 47.466 | 5.801 | 1.51824 | 59.0 |
| 28 | −30.085 | 1.023 | 1.80400 | 46.6 |
| 29 | −419.733 | 26.200 | | |
| 30 | 363.645 | 2.078 | 1.51824 | 59.0 |
| 31 | −84.470 | 0.098 | | |
| 32 | 38.957 | 1.023 | 1.83480 | 42.7 |
| 33 | 16.895 | 5.776 | 1.51742 | 52.2 |
| 34 | −201.143 | 3.764 | | |
| 35 | −33.666 | 1.064 | 1.83400 | 37.2 |
| 36 | 29.213 | 5.416 | 1.48749 | 70.4 |
| 37 | −52.422 | 0.098 | | |
| 38 | 134.870 | 2.307 | 1.48749 | 70.4 |
| 39 | −80.608 | 0.098 | | |
| 40 | 44.455 | 6.136 | 1.48749 | 70.4 |
| 41 | −31.202 | 9.769 | | |
| 42 | ∞ | 33.000 | 1.58267 | 46.5 |
| 43 | ∞ | 13.200 | 1.51633 | 64.1 |
| 44 | ∞ | | | |

Table 2 below lists the values of D10, D18 and D21 (i.e, the lens group spacings) at each of the wide-angle end, the mid-position, and the telephoto end, as well as the value of the focal length f of the zoom lens main body 2 at each of these positions.

TABLE 2

| | Wide-angle end | Mid-position | Telephoto end |
|---|---|---|---|
| D10 | 0.802 | 31.639 | 46.360 |
| D18 | 46.882 | 12.104 | 6.107 |
| D21 | 5.531 | 9.472 | 0.748 |
| f | 6.730 | 26.918 | 134.591 |

The top portion of Table 3 below lists, for the supportive lens attachment 4 of Embodiment 1, the surface number # in order from the object side, the radius of curvature R (in mm) near the optical axis of each lens element surface, the on-axis surface spacing D, as well as the index of refraction $N_d$ and the Abbe value $\nu_d$ (at the sodium d-line) for each lens element. The supportive lens attachment 4 is insertable in the space following lens surface 29 of the zoom lens main body (i.e., in the space between sub-group G4A and sub-group G4) so that the on-axis position of the first lens surface of the supportive lens attachment 4 is positioned a distance 1.50 mm to the right of the on-axis position of lens surface 29.

The bottom portion of Table 3 below lists the focal distance fw at the wide-angle end of the zoom lens main body with the supportive lens attachment 4 of Embodiment 1 positioned as described above, the focal distance $f_1$ of the positive lens group of the supportive lens attachment 4, the focal distance $f_2$ of the negative lens group of the supportive lens attachment 4, and the value of the ratio $f_1/f_2$ in Condition (1).

TABLE 3

| # | R | D | $N_d$ | $\nu_d$ |
|---|---|---|---|---|
| 1 | 650.000 | 1.000 | 1.80518 | 25.4 |
| 2 | 125.000 | 3.000 | 1.64503 | 52.4 |
| 3 | 708.000 | 0.200 | | |
| 4 | 52.430 | 4.000 | 1.50845 | 67.5 |
| 5 | −52.900 | 5.704 | | |
| 6 | −45.000 | 2.000 | 1.69960 | 54.1 |
| 7 | −430.000 | 3.796 | | |
| 8 | 38.800 | 2.000 | 1.81386 | 48.0 |
| 9 | 28.200 | | | |
| $f_w$ = 8.220 | | | | |
| $f_1$ = 55.168 | | | | |
| $f_2$ = −45.328 | | | | |
| $f_1/f_2$ = −1.217 | | | | |

As indicated the bottom portion of Table 3, $f_1/f_2$ equals −1.217 and thus Condition (1) is satisfied.

Embodiment 2

Figure 5:
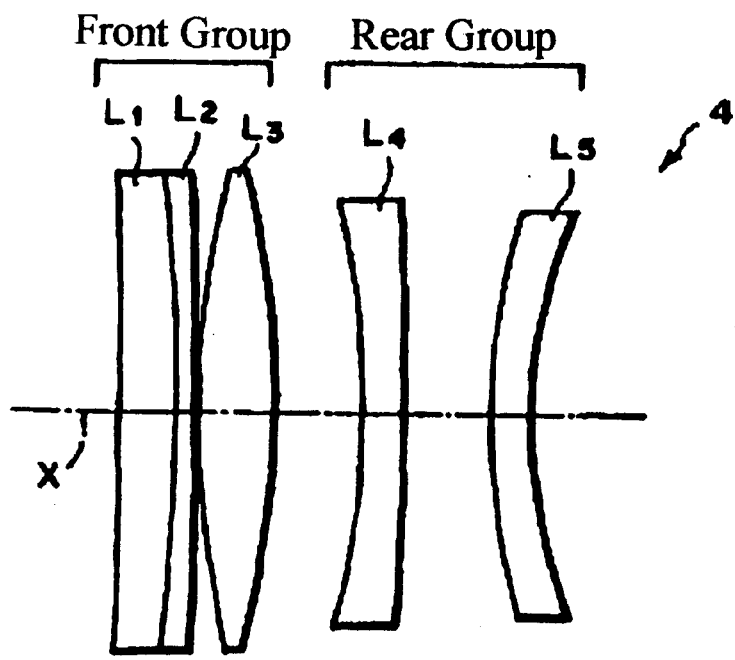
FIG. 5 shows the supportive lens attachment 4, according to Embodiment 2, oriented so as to extend the focal length of the zoom lens.

The zoom lens of this embodiment employs the same zoom lens main body as in Embodiment 1 (i.e., constructed as per Table 1), but has the supportive lens attachment 4 that is illustrated in FIG. 5 insertable into the light path.

The top portion of Table 4 below lists the surface number #, in order from the object side, the radius of curvature R (in mm) near the optical axis of each lens element surface, the on-axis surface spacing D, as well as the index of refraction $N_d$ and the Abbe value $\nu_d$ (at the sodium d-line) for each lens element of the supportive lens attachment 4 that, in this embodiment, is insertable in the space between sub-group G4A and sub-group G4B so that the first lens surface of the supportive lens attachment 4 is again positioned a distance 1.50 mm to the right of the on-axis position of lens surface 29.

The bottom portion of Table 4 lists the focal distance $f_w$ at the wide-angle end of the zoom lens main body with supportive lens attachment 4 positioned as described above, the focal distance $f_1$ of the positive lens group of the supportive lens attachment 4, the focal distance $f_2$ of the negative lens group of the supportive lens attachment 4, and the value of the ratio $f_1/f_2$ in Condition (1).

TABLE 4

| # | R | D | $N_d$ | $\nu_d$ |
|---|---|---|---|---|
| 1 | −708.000 | 3.000 | 1.50180 | 66.6 |
| 2 | −125.000 | 1.000 | 1.52864 | 52.6 |
| 3 | −650.000 | 0.200 | | |
| 4 | 49.485 | 4.000 | 1.50996 | 69.3 |
| 5 | −49.928 | 4.773 | | |
| 6 | −45.000 | 2.000 | 1.81468 | 40.9 |
| 7 | −430.000 | 4.727 | | |
| 8 | 38.800 | 2.000 | 1.81437 | 43.9 |
| 9 | 28.200 | | | |
| fw = 8.220 | | | | |
| $f_1$ = 49.565 | | | | |
| $f_2$ = −40.644 | | | | |
| $f_1/f_2$ = −1.219 | | | | |

As indicated the bottom portion of Table 4, $f_1/f_2$ equals −1.219 and thus Condition (1) is satisfied.

Figure 6:
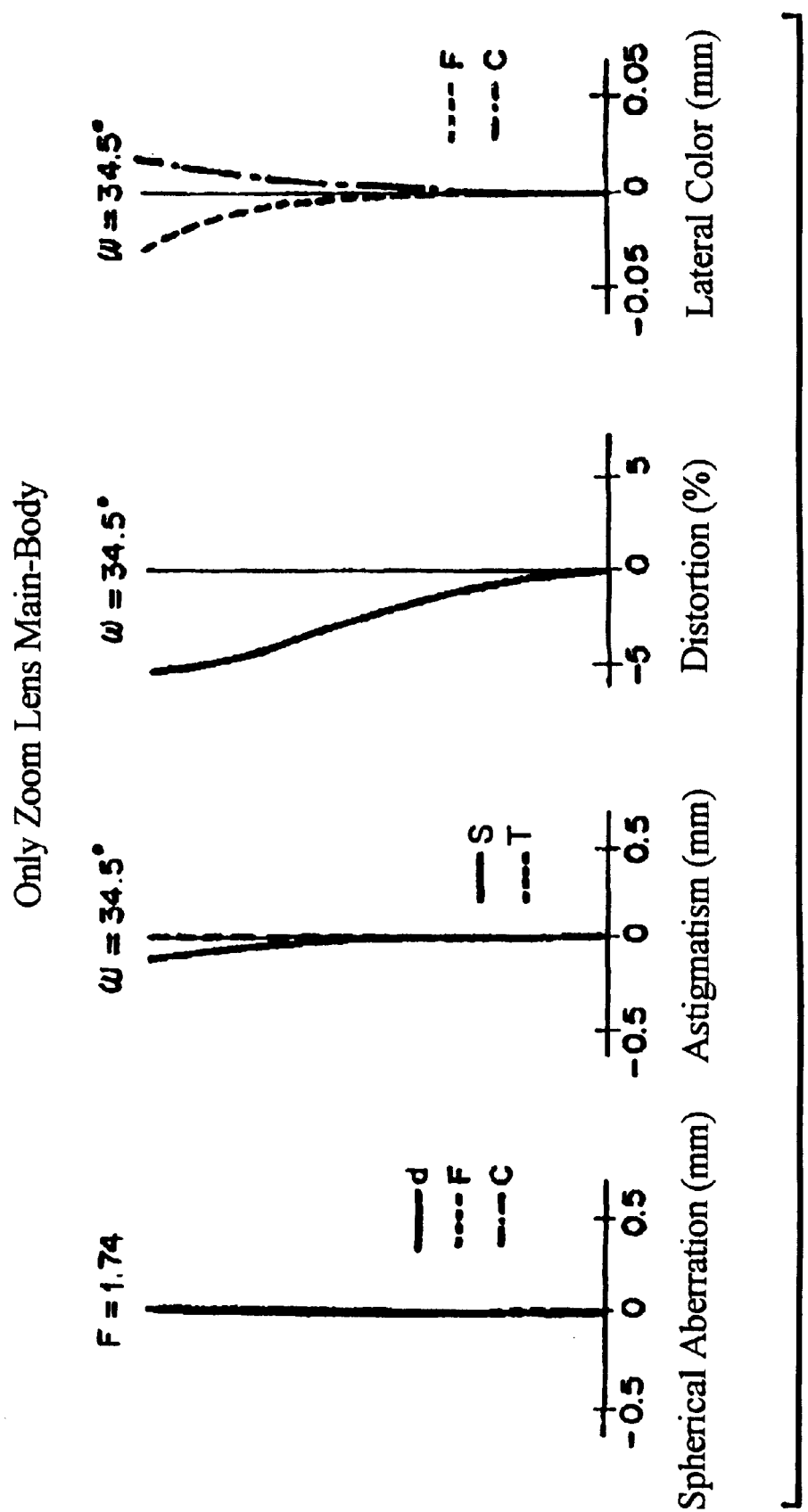
FIG. 6 shows the spherical aberration, astigmatism, distortion, and lateral color resulting from using the zoom lens main body without the supportive lens attachment 4 being in the light path.

FIG. 6 shows the spherical aberration, astigmatism, distortion, and lateral color resulting from using the zoom lens main body without the supportive lens attachment 4 being in the light path. The spherical aberration is given for each of the d, F and C lines, and the astigmatism is given in both the sagittal S and the tangential T planes.

Figure 7:
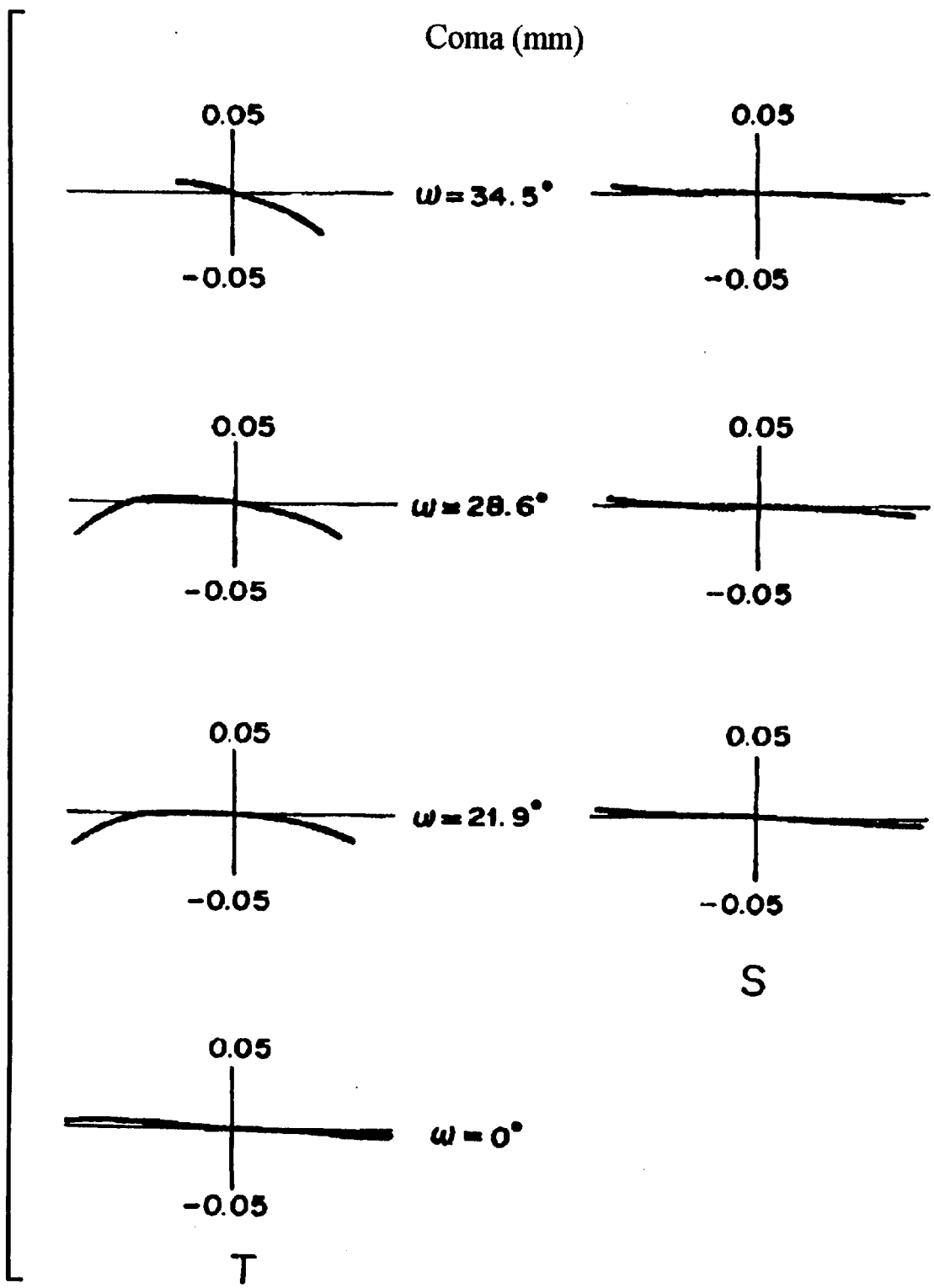
FIG. 7 shows, in the left column, the coma in the tangential T plane and, in the right column, the coma in the sagittal S plane as a function of image angle resulting from using the zoom lens main body without the supportive lens attachment 4 being in the light path.

FIG. 7 shows the coma in the tangential T (left column) and sagittal S (right column) planes as a function of the half-image angle ω in the case of using the zoom lens main body without the supportive lens attachment 4 being in the light path. The coma for ω=0° in the sagittal plane has been omitted from the figure since this aberration is always identical to the coma for ω=0° in the tangential plane.

Figure 8:
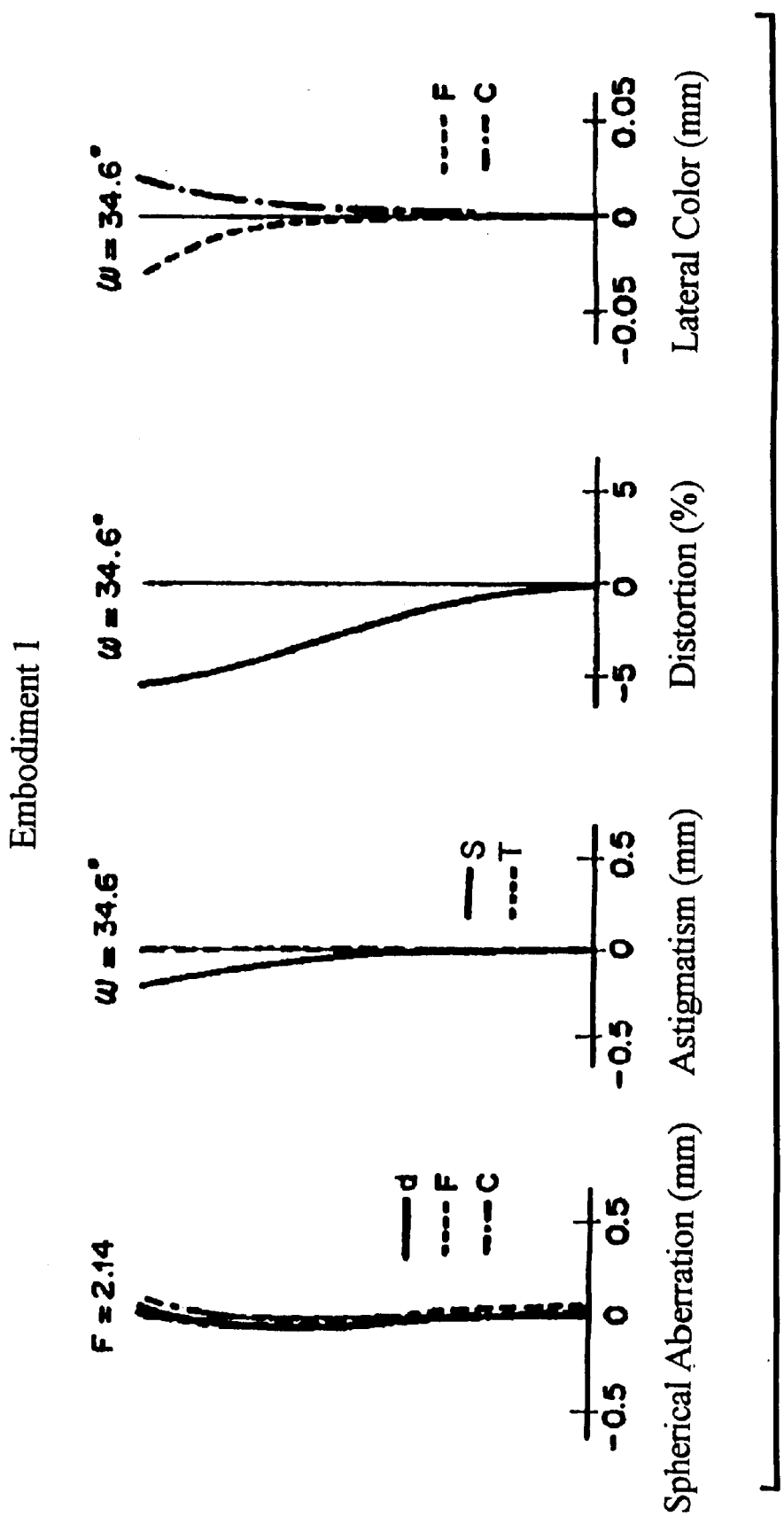
FIG. 8 shows the spherical aberration, astigmatism, distortion, and lateral color in the case of the supportive lens attachment of Embodiment 1 being in the light path of the zoom lens main body so as to increase the focal length of the zoom lens.

FIG. 8 shows the spherical aberration, astigmatism, distortion, and lateral color resulting from using the zoom lens main body with the supportive lens attachment 4 of Embodiment 1 being in the light path.

Figure 9:
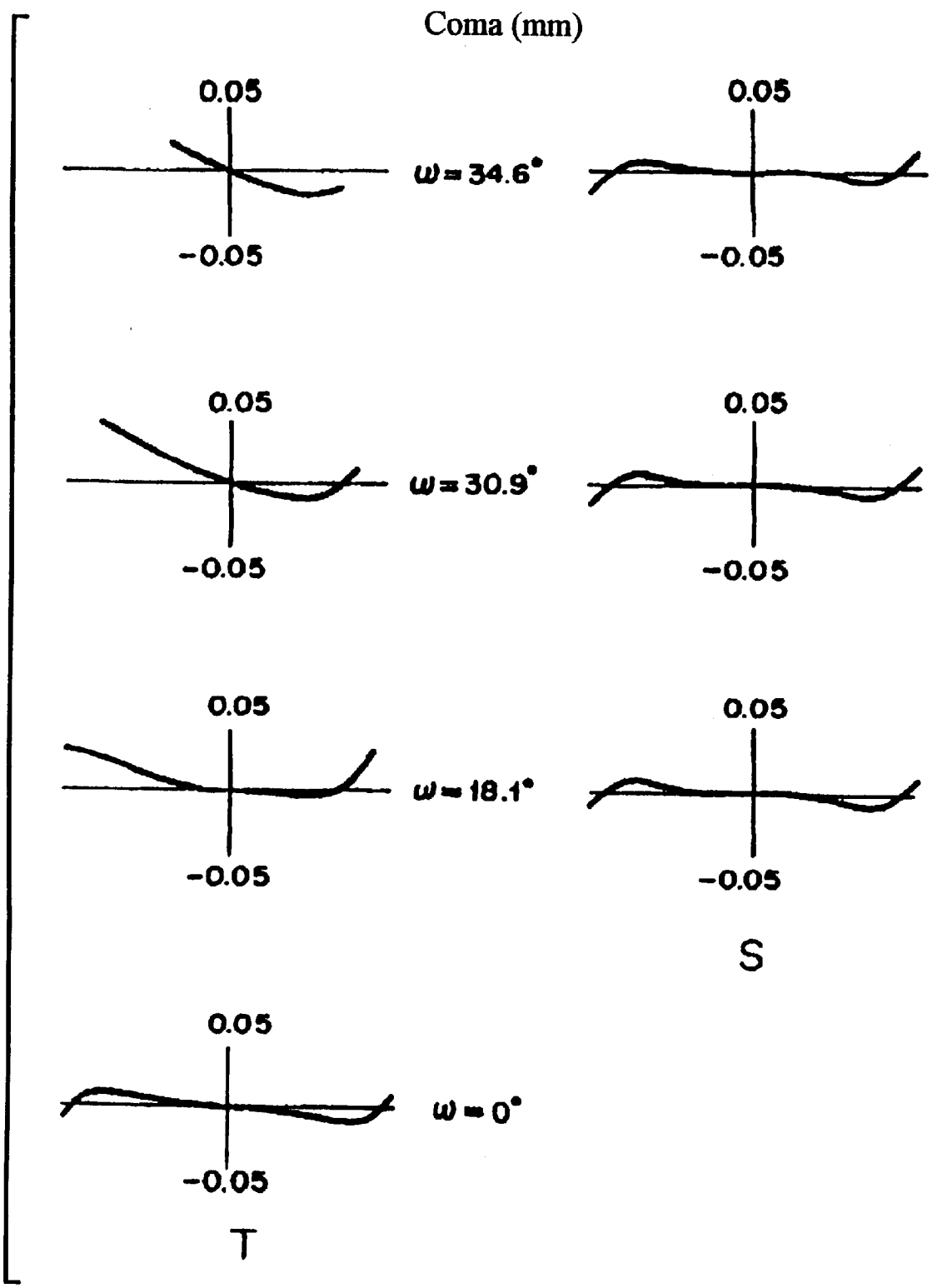
FIG. 9 shows, in the left column, the coma in the tangential T plane and, in the right column, the coma in the sagittal S plane as a function of image angle in the case of the supportive lens attachment of Embodiment 1 being in the light path of the zoom lens main body so as to increase the focal length of the zoom lens.

FIG. 9 shows the coma in the tangential plane T (left column) and sagittal plane S (right column) as a function of the half-image angle ω in the case using the zoom lens main body with the supportive lens attachment 4 of Embodiment 1 being in the light path. Once again, the coma for ω=0° in the sagittal plane S has been omitted from the figure, for the same reason as discussed above for FIG. 7.

Figure 10:
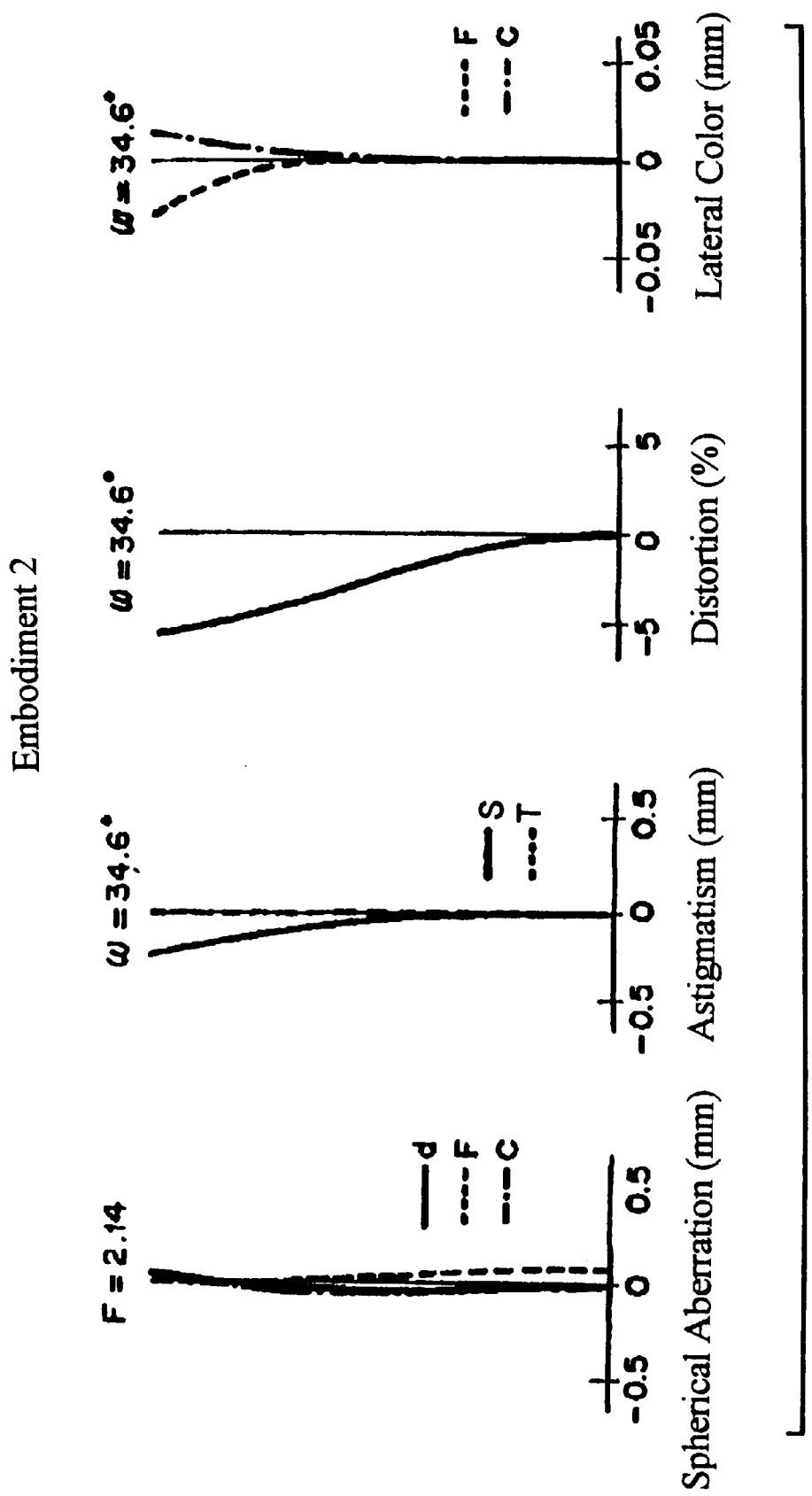
FIG. 10 shows the spherical aberration, astigmatism, distortion, and lateral color in the case of the supportive lens attachment of Embodiment 2 being in the light path of the zoom lens main body so as to increase the focal length of the zoom lens.

FIG. 10 shows the spherical aberration, astigmatism, distortion, and lateral color resulting from using the zoom lens main body with the supportive lens attachment 4 of Embodiment 2 being in the light path. Once again, the spherical aberration is given for each of the d, F and C lines, and the astigmatism is given in both the sagittal S and the tangential T planes.

Figure 11:
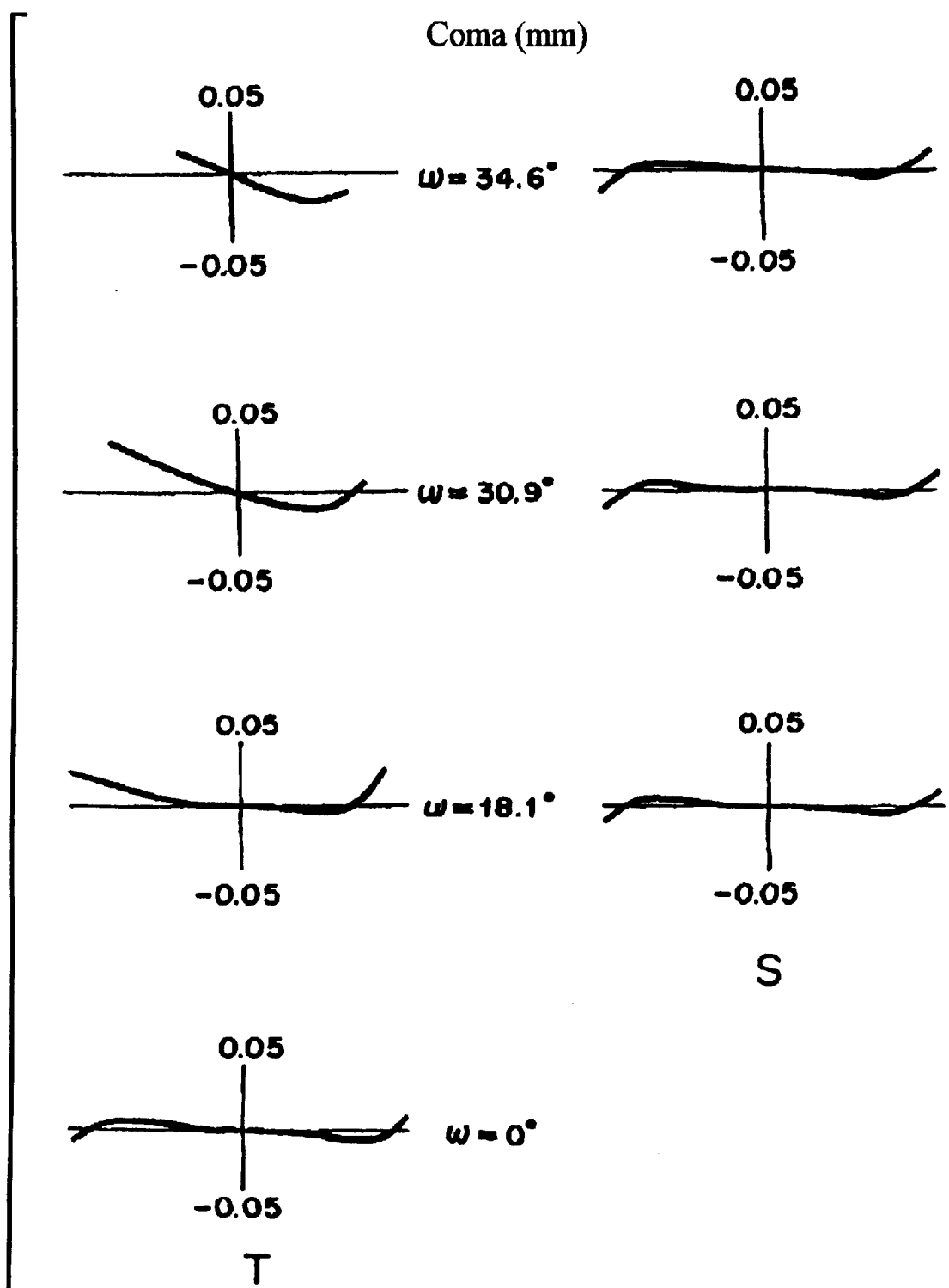
FIG. 11 shows, in the left column, the coma in the tangential T plane and, in the right column, the coma in the sagittal S plane as a function of image angle in the case of the supportive lens attachment of Embodiment 2 being in the light path of the zoom lens main body so as to increase the focal length of the zoom lens.

FIG. 11 shows the coma in the tangential plane T (left column) and sagittal plane S (right column) as a function of the half-image angle ω in the case using the zoom lens main body with the supportive lens attachment 4 of Embodiment 2 being in the light path. Once again, the coma for ω=0° in the sagittal plane S has been omitted from the figure, for the same reason as discussed above for FIG. 7.

As is apparent from these figures, the zoom lens of the present invention provides for favorable correction of aberrations using the zoom lens main body without the supportive lens attachment 4 being in the light path, as well as with the supportive lens attachment 4 of Embodiment 1 or Embodiment 2 being in the light path.

The invention being thus described, it will be obvious that the same may be varied in many ways. For example, the number of lens elements of a particular lens group may be modified for a particular application. Further, it is not necessary that the supportive lens attachment 4, by itself, be a nearly afocal optical system. Further, as illustrated in FIG. 3C, the present invention may be mounted in reverse, for other specialized applications in order to serve as a reducer lens attachment rather than an extender lens attachment. Such variations are not to be regarded as a departure from the spirit and scope of the invention. Rather the scope of the invention shall defined as set forth in the following claims and their legal equivalents. All such modifications as would be obvious to one skilled in the art are intended to be included within the scope of the following claims.

What is claimed is:

1. A zoom lens, primarily intended for use with a television camera, said zoom lens comprising:
   a zoom lens main-body constructed using at least four lens groups including, in order from the object side:
      a first lens group of positive refractive power that is fixed relative to the image surface when zooming;
      a second lens group of negative refractive power that moves axially toward the image surface when zooming from the wide-angle end to the telephoto end in order to change the image magnification;
      a third lens group which moves first in one axial direction and then in the opposite axial direction during zooming so as compensate for what would otherwise be a shifting of the image position when changing the image magnification;
      a fourth lens group having a front sub-assembly and a rear sub-assembly, the front sub-assembly and the rear subassembly being spaced from one another and at a fixed axial location during zooming; and
   a supportive lens attachment which may be removably positioned in the light path of the zoom lens main body within the space between the front sub-assembly and the rear sub-assembly, said supportive lens attachment being formed of two lens groups which have opposite refractive power.

2. The zoom lens of claim 1 wherein, the supportive lens attachment consists of only two lens groups, and the following condition is satisfied $$-1.3 < f_1/f_2 < -1.1$$

where
   $f_1$ is the focal distance of the lens group in the supportive lens attachment having positive refractive power, and
   $f_2$ is the focal distance of lens group in the supportive lens attachment having negative refractive power.

3. The zoom lens of claim 2, wherein the supportive lens attachment is positioned in the light path of the zoom lens main body with its lens group of positive refractive power nearest the object side.

4. The zoom lens of claim 1, wherein the first lens group of the zoom lens main body, in order from the most object side, comprises five lens elements.

5. The zoom lens of claim 1, wherein the second lens group of the zoom lens main body, in sequential order from the most object-side lens group, comprises four lens elements.

6. The zoom lens of claim 1, wherein the third lens group of the zoom lens main body, in sequential order from the most object-side lens group, comprises two lens elements.

* * * * *